BEMENDEFER & SMITH.
Cultivator.
No. 66,284.
Patented July 2, 1867.
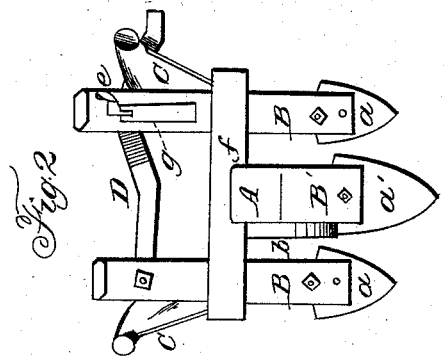
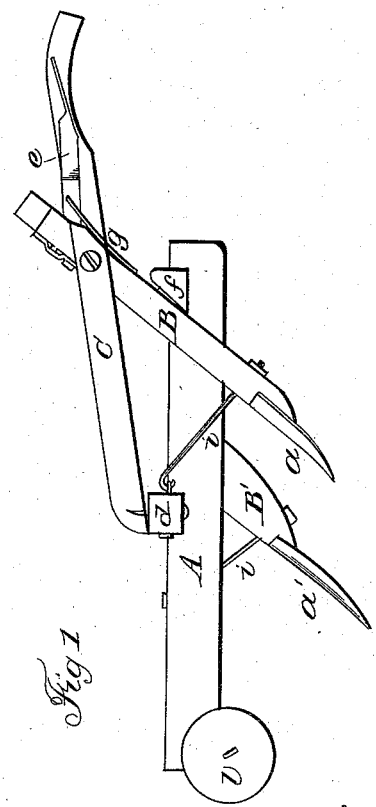
WITNESSES:
INVENTOR:
H. F. Bemendefer
George Smith
by Alexander & Mason
attys

United States Patent Office.

HENRY F. BEMENDEFER AND GEORGE SMITH, OF ATTICA, OHIO.

Letters Patent No. 66,284, dated July 2, 1867.

---

PLOUGHS.

---

The Schedule referred to in these Letters Patent and making part of the same.

---

TO ALL WHOM IT MAY CONCERN:

Be it known that we, HENRY F. BEMENDEFER and GEORGE SMITH, of Attica, in the county of Seneca, and in the State of Ohio, have invented certain new and useful improvements in Ploughs; and do hereby declare that the following is a full, clear, and exact description thereof, reference being had to the accompanying drawings, and to the letters of reference marked thereon, making a part of this specification.

In the accompanying drawings, A represents the plough-beam, having a horizontal bar, $d$, near its centre, and a bar, $f$, at the rear end. B' represents a short upright having an adjustable shovel, $a'$, at its bottom. This upright or standard is connected to the beam A near its centre, and braced by a rod, $i$. $b$ represents a wheel or roller connected to a small ——— provided with an opening for attaching it to the end of standard B' when required for laying off the ground, and in lieu of the shovel $a'$. When not in use this roller may be temporarily attached to the plough-beam, as shown in fig. 1, or to any other part of the plough. B B represent two standards, which are pivoted to the bar $f$, and extend a suitable distance above for pivoting to the sides of the plough-handles C C. These standards, as well as standard B', have shovels $a$ $a$ at their lower ends, and are placed slightly slanting, as shown, and are braced $i$ to the bar $d$. D represents a metallic bar, which is pivoted at one end to one of the standards B, and extends across to the other where it is passed through a keeper on the front of the standard. This bar is provided with a series of notches on its rear side, near one end, by which means it is held as desired. $e$ represents a spring-catch fitting into a slot at the upper end of the standard B, and extends through to the notches on the bar D. This catch has a spring, $g$, attached to it, which keeps it within the notch in the bar and holds the bar in place. It will be seen that the standards B B are both pivoted to the front of the bar $f$, and can be readily shifted on their pivots so as to regulate the distance between the shovels $a$ $a$. By means of the bar D and catch $e$ the operator can at once and readily adjust the standards so as to plough the ground, and form the rows as far apart as he desires. The braces $i$ $i$ are readily turned, by means of the swivels at their ends, to correspond with the movements of the standards.

Having thus fully described our invention, what we claim as new, and desire to secure by Letters Patent, is—

1. The bar D, spring-catch $e$, and spring $g$, when used for shifting the standards, substantially as specified.

2. The arrangement of the beam A, bars $d$ $f$, standards B B B' with their ploughs, and the roller $b$, when constructed, arranged, and used in the manner substantially as set forth.

In testimony that we claim the foregoing we have hereunto set our hands and seals this 25th day of April, 1867.

HENRY F. BEMENDEFER,
GEORGE SMITH.

Witnesses:
GEO. S. YINGLING,
H. GROSS.